United States Patent Office 3,462,193
Patented Aug. 19, 1969

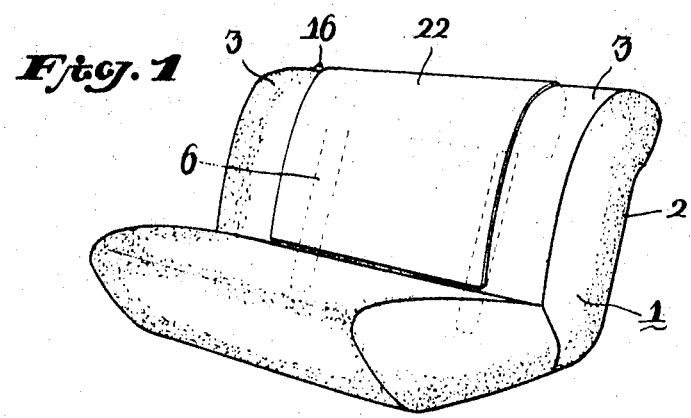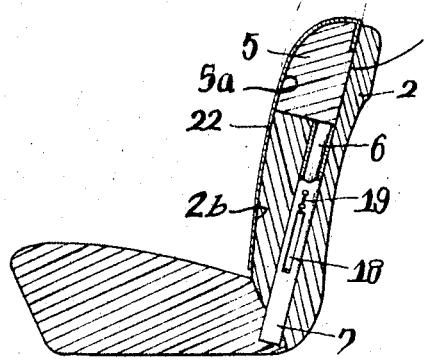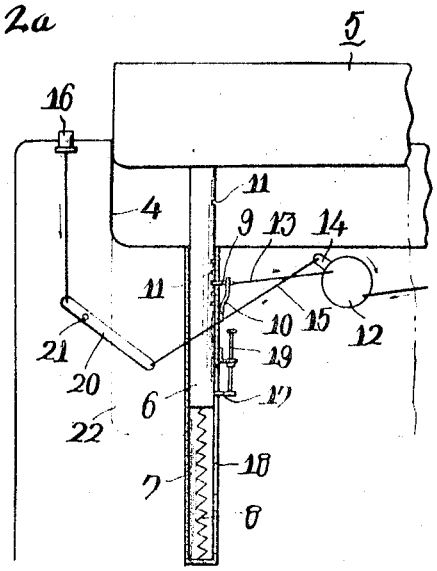

3,462,193
SEAT WITH A MOVABLE HEADREST
Yasuo Tamura, 3-2, Nihonbashi-Kayaba-cho,
Chuo-ku, Tokyo, Japan
Filed Oct. 13, 1967, Ser. No. 675,196
Claims priority, application Japan, Oct. 27, 1966,
41/99,051; Apr. 26, 1967, 42/26,297
Int. Cl. A47c 7/38, 1/10; A61g 15/00
U.S. Cl. 297—410                                10 Claims

ABSTRACT OF THE DISCLOSURE

A car seat comprising a backrest having a hollow part, a headrest movably disposed in the hollow part of the backrest for substantially vertical movement, and means for moving the headrest into a plurality of positions.

SPECIFICATION

The present invention relates to a car seat in general, and to a car seat with a movable headrest for the driver and its passenger, in particular. Heretofore, on the top of conventional car seats, an independent and separate headrest was provided and positioned manually. But this kind of removable headrest does not conform to current style of motor vehicles from the point of design. Further, the height of these conventional headrests are not adjustable and the headrest is fragile against concussion, which provides minimal safety in the case of traffic accidents.

It is an object of the present invention to provide a car seat with a vertically movable headrest disposed in the upper cut of the backrest, which eliminates the need for a separate headrest, as heretofore conventionally used.

It is another object of the present invention to provide a headrest protector having superior, strong and durable construction and mechanism.

It is still another object of the present invention to provide a headrest which affords safety against traffic accidents.

It is still another object of the present invention to provide a car seat with a headrest having a construction such that the height of the headrest can be freely adjusted by a remote controlling system.

It is yet another object of the present invention to provide a car seat with headrest, wherein the headrest may be elevated and stopped at a proper position by simply pushing a button, when necessary and the headrest may be restored to its starting position by actuating the button again, when the headrest is not required by the occupant.

With these and other objects in view, which will become apparent in the following detailed description, the present invention will be clearly understood in connection with the accompanying drawings, in which:

FIGURE 1 is a perspective view of a car seat with headrest designed in accordance with the present invention;

FIG. 2 is a cross-sectional side view of the car seat with headrest of FIG. 1;

FIG. 3 is a fragmentary front elevation of the headrest illustrating the stopper mechanism applied in the present invention;

Figure 4:
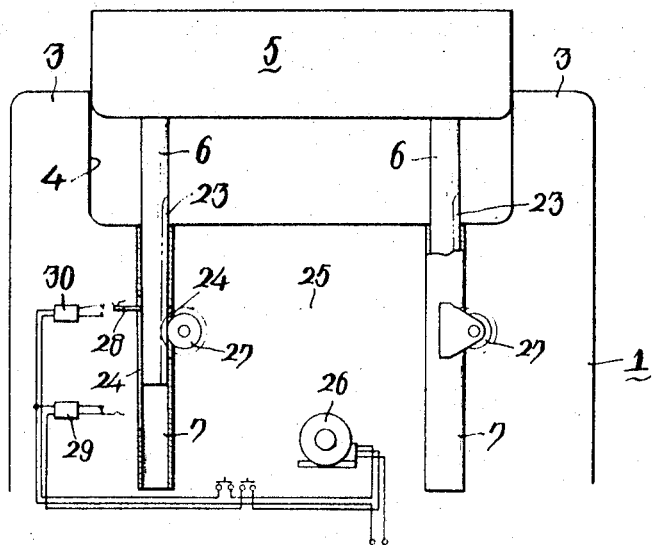
FIG. 4 is a front elevation of another embodiment of the present invention.

Referring now to the drawings, and in particular to FIGS. 1-3, there is illustrated a seat 1 forming a forwardmost recessed hollow part 4 between two ends 3, 3 and a rear surface 2a of the upper part of a backrest 2; and a headrest member 5, the same size as and complementary to the hollow part 4 is movably built into the hollow part 4. The front surface 5a of the headrest 5 is substantially aligned with the front surface 2b of the backrest 2 therebelow in all positions. Each headrest member 5 includes two legs 6 at the two sides thereof and the legs 6 are inserted in a cylindrical guide 7 in the backrest 2 for moving the headrest member 5 upwardly or downwardly. The legs 6 and the cylindrical guides 7 are provided with a spring 8, disposed therebetween, and a hook 9 is provided releasably positioned in the cylindrical guide 7, with a plate spring 10, urging the hook 9 toward and into the legs 6 so that the end of the hook 9 may be hooked into slots 11 (bezels) formed in the legs 6, by the action of the plate spring 10.

The other end of the hook 9 is connected to a wire 13, which is fastened to a cam 12. An arm 14 is provided on the cam axis which may be rotated clockwise, as indicated by the arrow in FIG. 3, for release of hook 9 from leg 6, which arm 14 is attached to a rod 15, the latter being operatively connected to a push-button 16. The hook 9 is disconnected from slots 11 by actuation of the button 16 and the legs 6 and the head-rest 5 are then elevated automatically by the upward force of spring 8, mounted in compression between the bottom of arm 6 and the guide 7.

The ends of the backrest will be then lifted until a stopper arm or lever 17 secured to the arm 6 and sliding through a groove 18 in the cylindrical guide 7, abuts a pin 19, adjustably connected to the guide 7. Consequently, the pin 19 has the function of controlling the stop-position of the backrest. The operative connection between the push-button 16 and the rod 15, includes a double-armed lever 20, pivotally supported by pivot 21. The top of the headrest member 5 contacts the inner surface of the hollow part 4 during the elevating process, whereby strong and tenacious characteristics against and of the backrest are achieved. To cover the hollow cavity 4 from exposure when the headrest is elevated, an apron 22 is provided which moves together with the headrest. Further, a bending of the headrest is prevented since the apron 22 lies between the back of the passenger and the front surface of the backrest.

Moreover, the apron 22 is optionally releasable at its upper end and may be easily replaced. The length of a single headrest is sufficient for use by various size occupants, although the headrest in accordance with the present invention may be made individually. Consequently, a single seat for a driver or passenger is included within the scope of the present invention.

Figure 5:
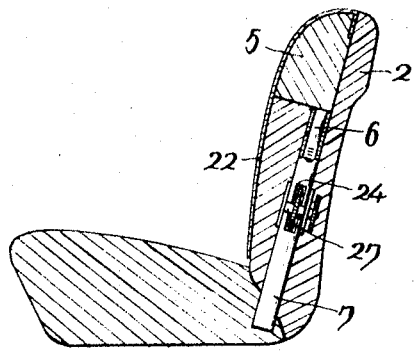
FIG. 5 is a cross-sectional side view of the car seat and head rest illustrated in FIG. 4.

Referring now again to the drawings, and more particularly to FIGS. 4 and 5, another embodiment of the present invention is illustrated, wherein the backrest of the seat forms the cavity 4 with sides 3, 3 thereof on its front upper part, and the headrest pillow 5 complementary to the hollow cavity 4, is contained movably therein. Legs 6 are fixed to the headrest 5 and set movably in the guides 7 in the backrest. Secured to one side of each leg are rack gears 23 and slits 24 are provided in the sides of the guides 7 adjacent the rack gears in which are inserted gears 27, rotatably mounted by chain 25 which chain 25 is moved by a reversible motor 26. Rack gears 23 of the legs 6 in guide 7 are in constant mesh with the gears 27 for raising and lowering the headrest as desired.

A lever 28 secured to the leg 6 extends therefrom through a longitudinal slit 24 in the guide 7 and slides therealong when the legs 6 are elevated up or down.

Upper and lower limit switches 30 and 29, respectively, are adjustably disposed in the upper and lower path of travel of the lever 28 and cooperate by contact with the lever 28 to turn off the motor 26 by breaking switch contact when the uppermost and lowermost positions are reached. The headrest has an apron 22 with its upper part on the back of the seat, and with its other end extending over the front part. Accordingly, the headrest device of the present invention includes, as mentioned above, a headrest pillow member built into the backrest and freely moved by an electrically controlled system.

Figure 6:
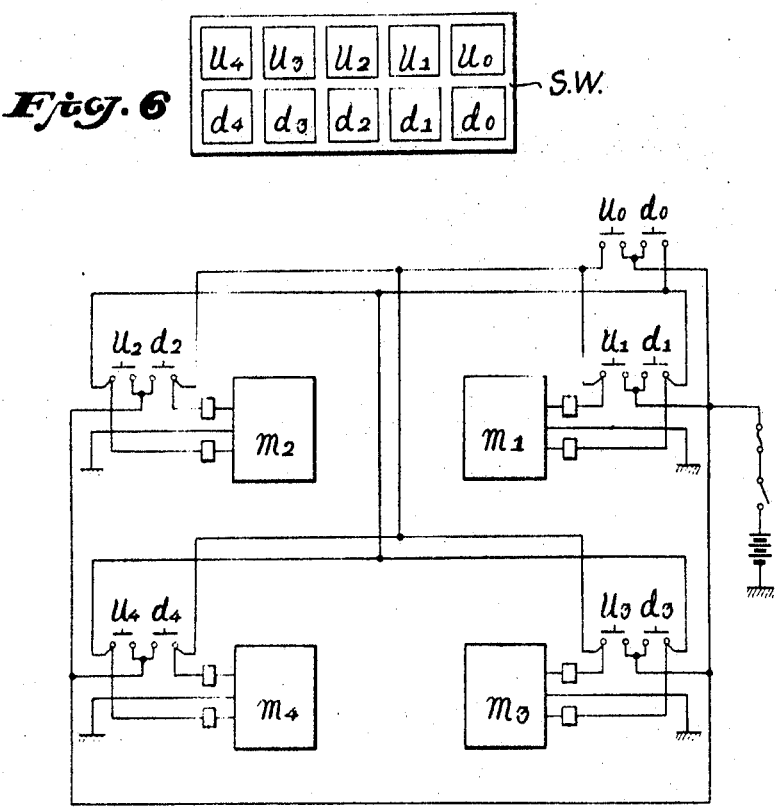
FIG. 6 is a diagram of an electric circuit used with the present invention.

Referring now again to the drawings, and more particularly to FIG. 6, as an example, when the headrest system of the present invention consists of four sets of headrests, as above described, one for the driver's seat, another for the front seat next to the driver's seat and two for the rear pasengers' seats, then the motors in these respective seats $m_1$, $m_2$, $m_3$, $m_4$ have ascending switches $u_1$, $u_2$, $u_3$, $u_4$ and descending switches $d_1$, $d_2$, $d_3$, $d_4$ and each headrest can be operated independently of the others. The ascending switch ($u_0$) and the descending switch ($d_0$) are connected so as to be operated with four motors and each switch is blocked as shown in FIG. 6 (SW).

If this is arranged on the dashboard, the driver can operate the headrest at ease when necessary. When the headrest is in the upper position and its rear surface contacts an inner surface of the hollow part 4 of the backrest, the readrest increases its tenacity or resistance against the pressure of an occupant's head on the backrest, and additionally, the apron 22 which elevates together with the headrest 5, prevents it from exposure and at the same time, as the apron is placed between the back of an occupant and the backrest, bending of the headrest is avoided. Moreover the apron 22 is free to be fastened or unfastened at the top end, and readily changed.

The above-mentioned switches $u$, $d$ may be operated by either a pushbutton switch or a changeover switch. As shown in FIG. 4, the seat is made long for various size occupants, and consequently the headrest is also made long. The operating part consisting of the two legs 6 and two gears 23 is divided into two units for aiding balancing of the headrest during elevation as well as lowering of the headrest, but it can be constructed with a single leg and gear unit as long as its movement is balanced. Therefore, when the headrest is short or provided specially for one particular person, this operating part may be made into a single unit. Of course, for the operating part, any device with other mechanism having gears may be adopted within the scope of the present invention so long as the above-mentioned feature is maintained.

Figure 7:
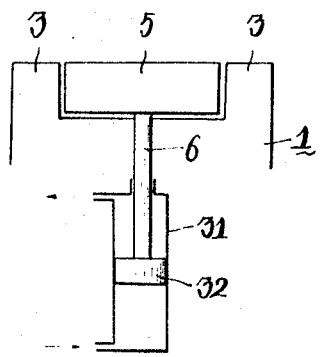
FIG. 7 is a fragmentary view of still another embodiment of the present invention.

Referring now again to the drawings, and more particularly to FIG. 7 the operation of the headrest 5 of the present invention is illustrated by a pneumatic or hydraulic system. The headrest 5 is moved upwardly and downwardly, respectively, along the guide set in the backrest by operation of a piston 32 in a piston cylinder or actuator 31. The moving force in the actuator 31 can be controlled from the driver's seat by an electromagnetic valve, an operative valve, an electric current controlled valve or others.

While I have disclosed several embodiments of the present invention, it is to be understood that these embodiments are given by example only and not in a limiting sense.

I claim:

1. A seat comprising
a backrest having a front surface and a forwardmost recessed hollow part,
a headrest movably disposed in said hollow part of said backrest for substantially vertical movement,
means for moving said headrest to a plurality of positions and for holding said headrest thereat in position,
said hollow part being formed in the top portion of said backrest between two sides and a rear surface of said backrest,
said headrest being complementary to said hollow part and includes a front headrest surface substantially aligned with said front surface of the backrest therebelow and sliding along said two sides and said rear surface of said backrest of said hollow part during movement thereof,
said backrest and headrest constituting back members,
at least one guide means mounted in one of said back members,
at least one leg secured to the other of said back members and operatively connected movably to said at least one guide means,
said at least one guide means and leg longitudinally aligned parallel to at least a portion of said rear surface pointing in a substantially vertical direction,
said means for moving said headrest operatively connected to one of said at least one guide means or leg, and
said guide means and said leg for cooperatively guiding said headrest slidingly along said rear surface when moved by said means for moving said headrest.

2. The seat, as set forth in claim 1, further comprising an apron extending from the front of said headrest downwardly onto the front of said backrest, and
said apron mounted on said headrest for movement therewith and slidably disposed against said front of said backrest.

3. The seat, as set forth in claim 2, wherein
said headrest and apron are curved at the front thereof so as to form a smooth contour with the front of said backrest in all positions of said headrest, and
said headrest constituting an adjustably movable extension of said backrest.

4. The seat, as set forth in claim 1, further comprising means for limiting the relative movement of said at least one guide means and leg.

5. The seat, as set forth in claim 4, wherein
said means for limiting comprises,
a lever extending laterally from and secured to said at least one leg,
said at least one guide means having a longitudinal slot therein adjacent said lever through which said lever extends, and
contact means selectively positioned in the path of travel of said lever outside of said at least one guide means for cooperating with said lever when the latter in a direction of travel relative said longitudinal slot reaches said contact means and for terminating and preventing further relative movement of said at least one leg and guide means in said direction of travel.

6. The seat, as set forth in claim 1, wherein
said at least one guide means is a hollow elongated sleeve and is substantially vertically positioned in said backrest, and
at least part of said at least one leg is complementary to said hollow elongated sleeve and disposed movably therein.

7. The seat as set forth in claim 6, wherein
said means for moving said headrest comprises,
gear teeth on said at least one leg,
said sleeve formed with an opening adjacent said gear teeth,
a gear means disposed at least partly within said opening and meshing with said gear teeth, and
motor means for driving said gear means.

8. The seat, as set forth in claim 6, wherein
said means for moving said headrest comprises,
fluid actuating means,
said sleeve being fluid tight,
said at least one leg forming a piston portion, and
said sleeve and piston portion constituting said fluid actuating means.

9. The seat, as set forth in claim 6, wherein
said means for moving said headrest comprises,
a compression spring disposed in said sleeve between the bottom of said at least one leg and said sleeve for urging said at least one leg upwardly,
said leg forming a plurality of slots therealong,
said sleeve formed with an opening at the side thereof adjacent said plurality of slots,
hook means for passing through said opening and into one of said plurality of slots, selectively, and preventing movement of said at least one leg, and
means for disengaging said hook means from said plurality of slots.

10. The seat, as set forth in claim 9, wherein
said means for disengaging comprises,
a rotatable cam,
a wire connecting said hook means to said cam,
spring means operatively connected to said hook means for urging said hook means against said at least one leg, and
means for turning said cam for pulling said hook means out of said plurality of slots against the force of said spring means.

References Cited

UNITED STATES PATENTS

| | | | |
|---|---|---|---|
| 2,701,606 | 2/1955 | Hascham et al. | 297—410 X |
| 2,935,120 | 5/1960 | Naus | 297—345 X |
| 2,985,229 | 5/1961 | Shamblin | 297—410 |
| 2,990,008 | 6/1961 | Bien | 297—397 |
| 3,159,427 | 12/1964 | Lawson | 297—410 |
| 3,166,282 | 1/1965 | Nolan | 248—124 |
| 3,194,187 | 7/1965 | Linder et al. | 297—345 X |
| 3,311,413 | 3/1967 | Martens | 297—410 |
| 3,343,875 | 9/1967 | Ferrara | 297—410 |
| 3,345,107 | 10/1967 | Homier et al. | 297—410 |

CASMIR A. NUNBERG, Primary Examiner

U.S. Cl. X.R.

297—396